Jan. 22, 1963  S. P. LOCKE  3,074,742
BACK-UP HITCH FOR DOUBLE AXLED WAGON OR TRAILER
Filed June 8, 1960  4 Sheets-Sheet 1
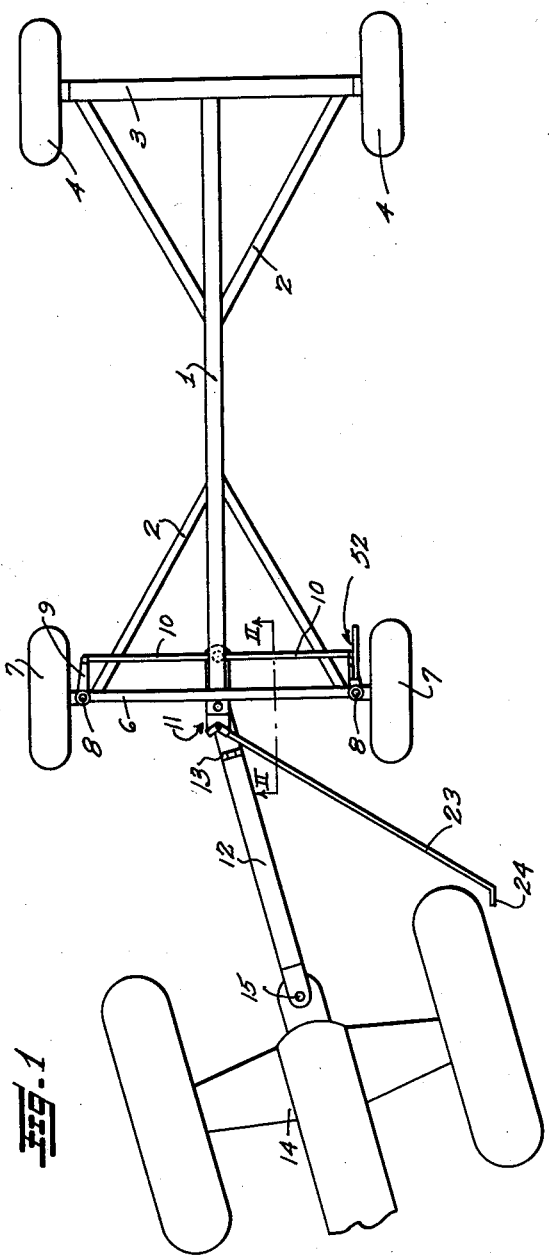
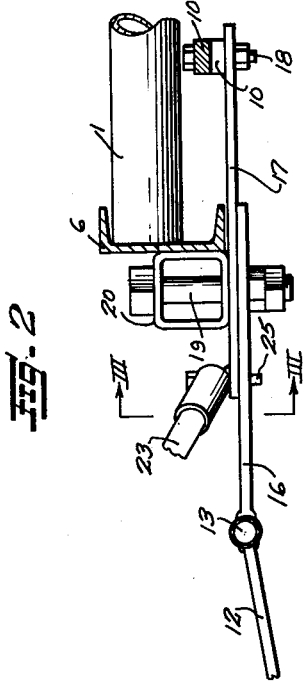
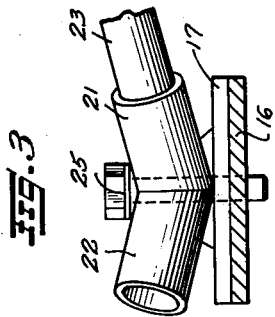
Inventor
Sam P. Locke

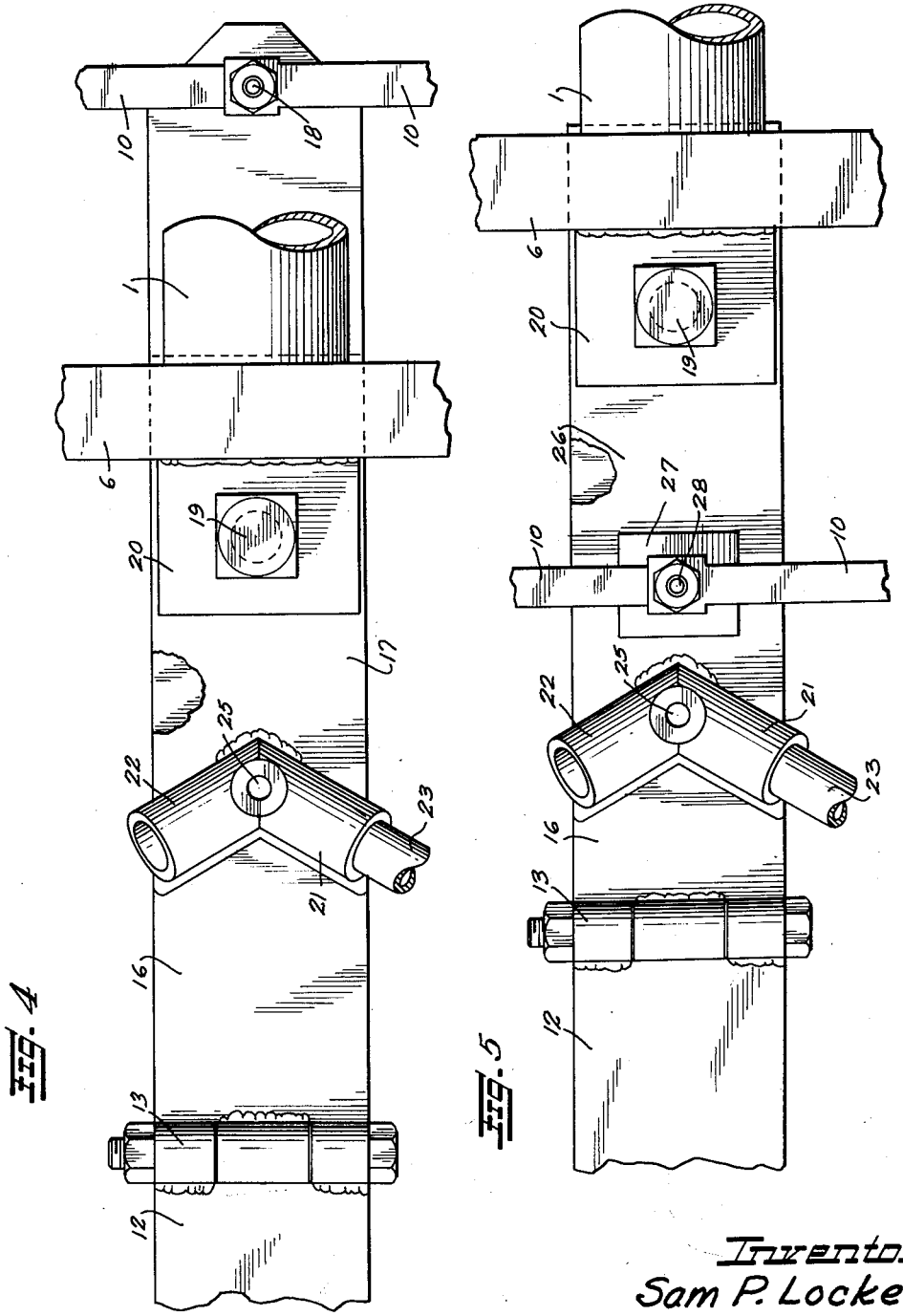

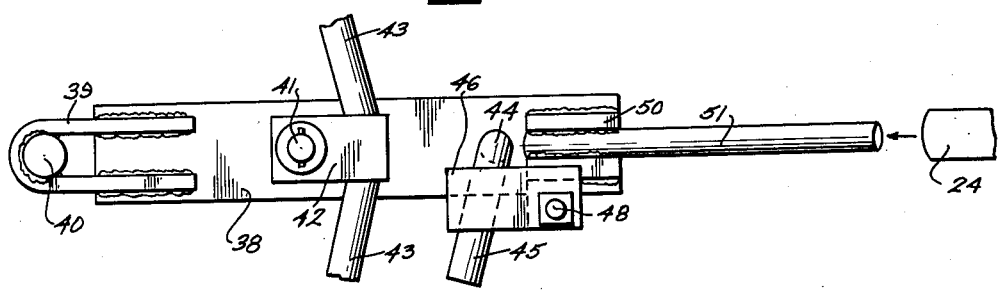
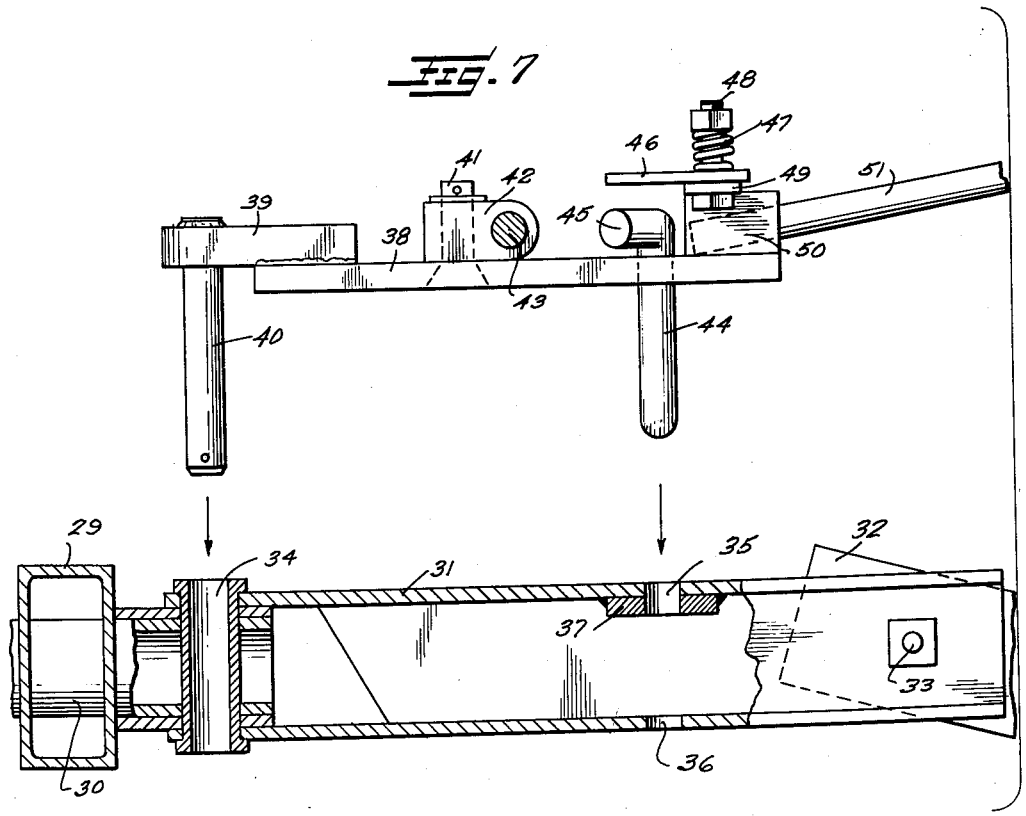

Jan. 22, 1963 S. P. LOCKE 3,074,742
BACK-UP HITCH FOR DOUBLE AXLED WAGON FOR TRAILER
Filed June 8, 1960 4 Sheets-Sheet 4
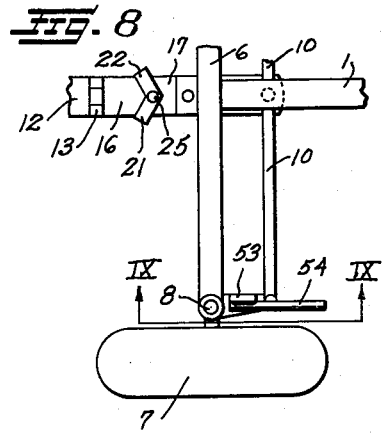
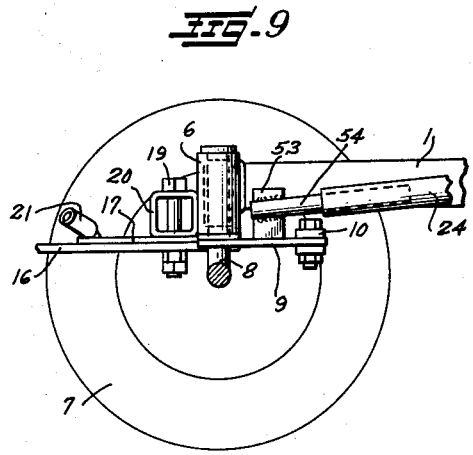
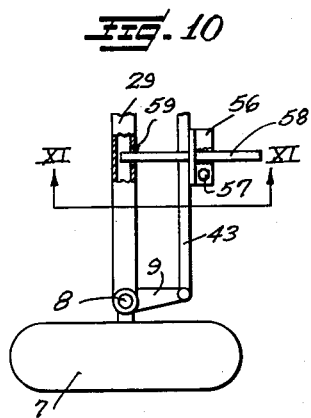
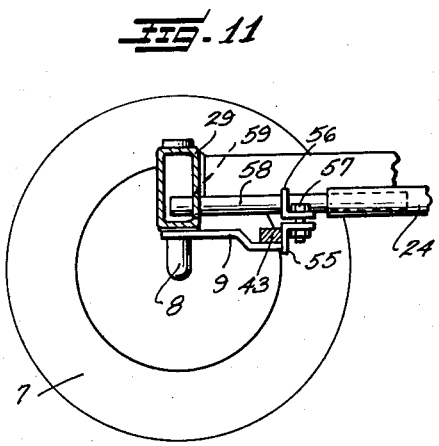
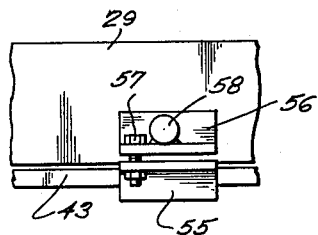
Inventor
Sam P. Locke
Attys es Patent Office
3,074,742
Patented Jan. 22, 1963

3,074,742
BACK-UP HITCH FOR DOUBLE AXLED
WAGON OR TRAILER
Sam P. Locke, Thompson, Mo.
(Mexico, Mo.)
Filed June 8, 1960, Ser. No. 34,656
1 Claim. (Cl. 280—445)

This invention relates to improvements in a back-up hitch for a double axled wagon or trailer, and more particularly to a draw-bar and hitch pole assembly connected to the forward axle of a wagon or a trailer with means associated directly with the draw-bar assembly or with the steering linkage of the wagon to enable the wagon to be readily guided when backed by means of a power vehicle or tractor connected to the hitch pole, although the invention may have other uses and purposes as will be apparent to one skilled in the art.

Herein, and in the appended claims, the terms wagon and trailer are utilized synonymously, and where a four wheeled or double axled wagon or trailer is referred to, such terminology means that the wagon or trailer has both front and rear axles with one or more wheels at each end of each axle, there being a draw-bar and hitch pole assembly connected to the front axle of the vehicle for towing the same behind a tractor or other power vehicle.

The instant invention is usable with four wheeled wagons or trailers of substantially any type or character having the steering linkage including the tie rods either in front of or behind the front axle of the vehicle. Also, it makes no difference what type or kind of body construction is utilized on the wagon or trailer, from purely a flat floor to any kind of body or corner post arrangement for the hauling of hay, produce, boxes and crates, sand and gravel, tankage such as water and milk, or substantially any desired material. Not only is the instant invention highly desirable for use in connection with wagons and trailers in rural areas for the hauling of materials to and from produce and dairy farms, but the invention will also have uses in various industrial locations, and even for utility trucks utilized inside manufacturing plants.

Extreme difficulty has been experienced in the past in endeavoring to back a four wheeled wagon or trailer with reasonable accuracy to a desired loading or unloading position, solely by actuation of the tractor or power vehicle to which the wagon is connected by means of a pole or tongue. This problem was particularly aggravated when it was desired to position the rear end or tail gate of the wagon in confronting relationship to a loading platform, or similarly accurately position the rear end of the wagon at a definite loading or unloading point, and particularly so if the wagon had to enter a confined space such as a stall, pass through a doorway, or be maneuvered under similar conditions. This difficulty is further aggravated when the driver of the tractor cannot see with any degree of satisfaction back of his load, such as a high and wide load of hay or the like. Such a back-up problem does not occur with the use of a trailer having only a rear axle, the front end of the trailer being connected to the body of the truck or tractor by way of confronting center plates, wherein the rear wheels of the tractor function in effect as the front wheels of the trailer. However, where the tractor is entirely separate from the trailer and connected thereto by a pole or tongue that must pivot relatively to the tractor and also pivot relatively to the wagon or trailer the resultant unit with plural articulations renders backing up an extremely irksome problem.

With the foregoing in mind, it is an important object of the instant invention to provide means for attachment to a wagon by which the foregoing problem is solved.

Another object of this invention is the provision of means connected to a four wheeled wagon or trailer having a tongue for pivotal connection to a power vehicle such as a tractor, which means not only enable the tractor and wagon to be backed accurately into a desired position, but actually render that problem extremely simple to execute.

A further feature of the invention resides in the provision of means attachable to the draw-bar assembly or steering mechanism of a four wheeled wagon or trailer pulled by a tractor to enable a man on the ground to readily guide the wagon or trailer so that it may be backed by the tractor accurately and easily into a loading or unloading position.

It is also an object of this invention to provide a split draw-bar assembly for a four wheeled wagon pulled by a tractor by way of a hitch pole, whereby a manually manipulatable guide rod may readily be connected to a receiving element on the wagon and manipulated by the tractor operator to steer the wagon while backing it into a desired position.

Also an object of this invention is the provision of a split draw-bar assembly for a four wheeled wagon to be pulled through a hitch pole by a tractor and means for the simple connection of a guide rod to the draw-bar assembly or steering linkage of the wagon, whereby a man on the ground may accurately steer the wagon into a desired position when it is being backed by way of the tractor.

Still another feature of this invention resides in the provision of a split draw-bar assembly for a four wheeled wagon to be pulled through a hitch pole by way of a tractor, with means on the wagon insuring a simple and positive connection of a guide rod by way of which an operator on the ground can guide the wagon and keep a portion of the split draw-bar assembly in line with the hitch pole so that the tractor may back the wagon accurately and the angle between the tractor and wagon is maintained at a minimum to provide as much direct push on the wagon from the tractor as is possible, eliminating the possibility of jack-knifing and rendering it simple to accurately position the wagon even in a very confined space.

Still another object of the instant invention is the provision of simple, economical, and durable means readily connected to a four wheeled wagon or trailer and by means of which the four wheeled wagon or trailer may be backed by a tractor easily, simply, and accurately.

While some of the more salient features, characteristics and advantages of the instant invention have been above pointed out, others will become apparent from the following disclosures, taken in conjunction with the accompanying drawings, in which:

FIGURE 1 is a fragmentary somewhat diagrammatic plan view of a wagon chassis equipped with mechanism embodying principles of the instant invention, showing the chassis operatively connected to a power vehicle such as a tractor;

FIGURE 2 is an enlarged fragmentary vertical sectional view taken substantially as indicated by the line II—II of FIGURE 1, looking in the direction of the arrows;

FIGURE 3 is a fragmentary transverse vertical sectional view taken substantially as indicated by the line III—III of FIGURE 2;

FIGURE 4 is a greatly enlarged fragmentary plan view of the tongue and draw-bar assembly seen in the central portion of FIGURE 1, more fully illustrating the mechanism embodying principles of the instant invention;

FIGURE 5 is a view similar in character to FIGURE 4 illustrating the same character of mechanism embodying principles of the instant invention as utilized with a wagon chassis having the steering mechanism ahead of the front axle;

FIGURE 6 is a fragmentary plan view of a wagon draw-bar assembly embodying principles of the instant invention but of a somewhat different construction;

FIGURE 7 is a fragmentary exploded side elevational view of the structure of FIGURE 6, with parts shown in section;

FIGURE 8 is a fragmentary plan view, being an enlargement of the lower central portion of FIGURE 1;

FIGURE 9 is a fragmentary vertical sectional view taken substantially as indicated by the line IX—IX of FIGURE 8;

FIGURE 10 is a fragmentary plan view, with parts broken away, illustrating a still different form of the instant invention;

FIGURE 11 is a fragmentary vertical sectional view taken substantially as indicated by the line XI—XI of FIGURE 10; and FIGURE 12 is a fragmentary front elevational view taken from the right-hand side of FIGURE 10.

As shown on the drawings:

For purposes of convenience and clarity the coupling assembly secured to the front axle of the wagon or trailer and to which the wagon tongue or pole is pivoted will be referred to herein and in the appended claims as a draw-bar assembly.

With reference more particularly to FIGURE 1, it will be seen that the various forms of the instant invention illustrated and described herein may be associated with a wagon or trailer chassis including a main frame member 1 with diagonal brace rods 2 connected fore and aft thereon, and both the frame member 1 and the rear brace rods are connected to a rear axle 3 with like wheels 4—4 thereon. The front brace rods 2 and the leading end of the frame member 1 are connected to a front axle 6 to which wheels 7—7 are connected by suitable vertical spindles 8—8. Each spindle is provided with a projecting spindle arm 9 to which a tie rod 10 is pivoted, such being a known form of steering linkage for wagons or trailers of this general type.

The wagon is provided with a draw-bar assembly, generally indicated by numeral 11 and to be later described herein, to which a wagon tongue or pole 12 is pivoted as indicated at 13.

A power vehicle such as a tractor diagrammatically shown at 14, may be connected to the forward or clevis end of the tongue 12 by a pivot pin 15, in a known manner.

Now with reference to FIGURES 2, 3 and 4, it will be seen that my novel draw-bar assembly is what might be termed a split draw-bar, embodying a lower plate 16 and an upper plate 17 having overlapping portions as seen in FIGURE 2. The lower plate 16 extends forwardly beyond the upper plate and is pivotally connected at 13 to the aforesaid tongue or pole 12. The upper plate 17 extends rearwardly of the lower plate for pivotal association with the tie rods 10—10 by means of a pin 18. The two plates 16 and 17 are arranged for pivotal movement relatively to each other around a pivot pin 19 which also passes through a box-like bracket 20 welded or equivalently secured to the front face of the front axle 6 of the wagon. It will also be noted from the showing in FIGURE 2 that the upper plate 17 is also pivotal relatively to the bracket 20 and axle 6 around the pin 19.

Welded or equivalently secured to the forward end of the upper plate 17 is a broad V-shaped pipe forming left- and right-hand sockets 21 and 22 respectively for the telescopic reception of the end of a manually manipulatable guide rod or handle 23 which is preferably in the form of a pipe and which also has a curved or angularly disposed end portion 24 for a purpose that will later appear. This guide rod or handle may be five or six feet in length to provide adequate clearance and leverage for the operator. It will be noted from the showing in FIGURES 2 and 3 that the sockets 21 and 22 are canted or inclined upwardly so that the outer portion of the guide rod 23 will clear the wheels of the truck and wagon as the case may be. Through suitable apertures in the apical region of the sockets 21 and 22 and in the plates 16 and 17 a pin 25 is freely disposed. When the pin is in locking position as seen in FIGURES 2 and 3 of the drawings, the plates 16 and 17 are locked together against relative pivotal movement and consequently function as an integrally constructed draw-bar assembly. On the other hand, when the pin 25 is withdrawn an operator may actuate the guide rod or handle 23 to pivot the plate 17 relatively to the plate 16 and thereby turn the forward wheels of the wagon as desired by way of the steering linkage including the tie rods 10—10. Thus, the ground operator may effectively and in a simple manner accurately guide the wagon to the desired location when the tractor is backing the wagon into position. It will also be noted that the structure is such that the tractor is exerting substantially a direct push against the plate 16 during this operation and the straight line push between the tractor and the wagon may be maintained to a substantial degree during the turning of the wagon into proper position. This offsets the disadvantage sometimes occurring when a relatively small truck cannot push a heavy load at a decided angular position thereto. Obviously, the wagon may be steered from either side depending upon which is most feasible for the operator, by placing the guide rod 23 in either of the sockets 21 or 22. The angularly disposed end 24 of the guide rod may be grasped by the driver of the tractor 14 under certain conditions and the wagon steered by the same operator that drives the tractor. However, when the load is too large for the tractor driver to see to the rear of it, it is more feasible to have another operator on the ground steer the wagon while it is being backed up.

When it is again desired to pull the wagon forwardly, it is a simple expedient to remove the guide rod and drop the pin 25 back in position to lock the draw-bar plates 16 and 17 together.

The foregoing description is in connection with a wagon having the steering linkage behind the front axle. In FIGURE 5, I have indicated how substantially the same structure may be utilized with a wagon having the steering linkage in front of the front axle. In this instance, the corresponding parts are the same as above described, with the exception that a foreshortened top plate 26 is utilized, this plate terminating just to the rear of the wagon axle 6, and a bracket 27 is mounted on the top plate to receive the end of a pivot pin 28 which pivotally connects the top plate with the tie rods 10—10 of the wagon steering linkage. The bracket 27 is needed to anchor the lower end of the pin 25, and not have the pin extend through the top plate into contact with the lower plate 16. The structure of FIGURE 5 functions in the same manner as that previously described.

Some wagons are built heavier than others including closed box section axles and a box section draw-bar arrangement with a clevis for receiving the wagon tongue or pole. The instant invention is readily applicable to the heavier wagon construction without altering the actual structure of the wagon to any material extent. In FIGURES 6 and 7 I have illustrated one application of the instant invention to provide a split draw-bar arrangement on a wagon having a closed box section front axle 29 with the main chassis frame member 30 extending therethrough. A box section draw-bar 31 is connected to the protruding end of the frame member 30, and this draw-bar has a clevis arrangement at the forward end to receive the rear end of the wagon tongue or pole 32 which is pivoted on a transverse pin 33.

In changing the original wagon structure to accommodate the instant invention, it is only necessary to remove the main pivot pin connecting the draw-bar to the wagon chassis and substitute therefor an eyelet bearing 34, and drill holes 35 and 36 through the box section draw-bar 31, reenforcing the draw-bar adjacent the upper hole 35 as indicated at 37, if desired.

This form of the instant invention embodies a draw-bar plate 38 to overlie the box section wagon draw-bar 31, and to the rear end of this plate a U-shaped member 39 is welded or equivalently secured with the bight of that member extending rearwardly beyond the plate, and in that bight portion of the member the main pivot pin 40 is welded. This main pivot pin 40 takes the place of the original pivot pin in the wagon draw-bar and when the parts are assembled is journalled in the eyelet bearing 34. Pivotally connected to the upper face of the plate 38 by a pin 41 is a lug 42 to which the ends of the tie rods 43—43 of the wagon steering linkage are connected. Extending through a suitable aperture in the forward portion of the plate 38 is a locking pin 44 having an offset head 45 thereon, this pin corresponding to the pin 25 of the previously described embodiment. The pin 44 passes through the apertures 35 and 36 in the wagon draw-bar 31 when the plate 38 is locked to the draw-bar for direct pulling of the wagon. When in locking position, the pin is retained against accidental dislodgement by a clip 46 extending over the head 45 of the pin and biased downwardly by a spring 47 on a bolt 48 extending through a lug 49 welded to a channel lug 50 which is in turn welded to the top of the plate 38. When it is desired to remove the pin to manually steer the wagon, it is a simple expedient to turn the head 45 from beneath the clip 46 and withdraw the pin.

In this instance, instead of utilizing left and right sockets 21 and 22 as above described, a rod 51 is welded in the channel lug 50, projecting forwardly of the center line of the plate 38 and inclined upwardly as seen in FIGURE 7. When it is desired to manually steer the wagon while backing up, it is a simple expedient for the operator to place the angular end 24 of the hollow guide rod 23 over the rod 51 from either side of the wagon, withdraw the locking pin 44, and readily steer the wagon by manipulating the guide rod. Obviously, it is to be assumed that the plate 38 is assembled to the draw-bar 31 in the manner indicated by the arrows in FIGURE 7.

At times it may be inconvenient to utilize steering means associated directly with the draw-bar structure of the wagon because of its central location, and the possibility of power take-off means from the tractor or something else interfering with proper manipulation of the steering means. With that in mind, it is deemed better to provide the wagon chassis with one or more auxiliary steering mechanisms. Such auxiliary means may be located in an efficient location and, by way of example and not by way of limitation, I have shown two such mechanisms in FIGURES 8 and 9, and FIGURES 10, 11 and 12 respectively.

With reference to FIGURE 1, an auxiliary steering means, generally indicated by numeral 52, is shown mounted on one of the spindle arms 9 embodied in the chassis steering linkage. This particular mechanism is best illustrated in FIGURES 8 and 9 and embodies merely a lug 53 welded to the spindle arm 9 and an upwardly inclined rod 54 welded to that lug. The bent end 24 of the steering rod 23 may be telescoped over the rod 54 as seen in FIGURE 9, and after the removal of the pin 25 to unlock the upper and lower draw-bar plates 16 and 17, the vehicle may adequately be steered by way of the rod 54. Obviously, another such lug and rod could be attached to the opposite spindle arm 9 in the event it is desirable to have an auxiliary steering means on both sides of the wagon chassis.

In FIGURES 10, 11 and 12 I have illustrated another form of auxiliary steering means associated with the wagon structure of FIGURES 6, 7 and 8. In this instance, an angle bracket 55 is welded to a tie rod 43 at a suitable location, and another similar angle bracket 56 is disposed above with confronting flange relationship to the bracket 55 and pivotally connected to the lower bracket by means of a bolt 57. Welded to the upper bracket 56 and extending through an aperture in the vertical flange thereof is a rod 58, the rear end of which extends through an oversize aperture 59 in the front panel of the box section front axle 29. In use, the bent end 24 of the guiding rod 23 is telescoped over the exposed end of the rod 58, and after removal of the locking pin 44 from the split draw-bar assembly, the wagon may be steered by actuating the steering arm 23, the oversize aperture 59 in the axle permitting some free play of the inner end of the rod 58 so as to eliminate any possibility of binding or placing undue strain on the wagon steering linkage.

Either of the auxiliary steering means herein shown may be used upon substantially any form of wagon to be used when access to the draw-bar assembly is obstructed by something else.

From the foregoing, it is apparent that I have provided simple and effective means whereby a four wheeled wagon or trailer connected to a tractor by a hitch pole or tongue may be easily backed into a desired position by the tractor, and steered either by an operator on the ground or in some cases by the tractor driver himself. The added steering means is obviously economical to construct and assemble on the wagon, is highly durable, and extremely simple in its operation, there being no tools whatever but the steering rod 23 necessary for the back-up operation. Furthermore, auxiliary steering means may be provided at substantially any side location in association with the steering linkage of the wagon or trailer.

It will be understood that modifications and variations may be effected without departing from the scope of the novel concepts of the present invention.

I claim as my invention:

Back-up steering means for a wagon having both front and rear axles with a steering linkage including tie rods associated with the wheels on the front axle, including a draw bar assembly comprising upper and lower draw bar members, one member being pivoted centrally to the front axle of the wagon, the other member being pivoted to both said one member and the steering linkage of the wagon, releasable means holding said members against relative pivotal movement, a separate steering rod for manual operation, and a member pivotally connected to one of the tie rods and extending through an oversize aperture in the front axle, said member being engageable by said steering rod for manual guidance of the wagon when the same is backed and after release of said releasable means.

References Cited in the file of this patent

UNITED STATES PATENTS

| | | |
|---|---|---|
| 1,366,765 | Byron | Jan. 25, 1921 |
| 1,502,337 | Hass et al. | July 22, 1924 |
| 1,547,542 | Weber | July 28, 1925 |
| 1,724,564 | Craig | Aug. 13, 1929 |
| 2,232,550 | McNamara | Feb. 18, 1941 |
| 2,603,499 | Netzband | July 15, 1952 |